Figure 1:
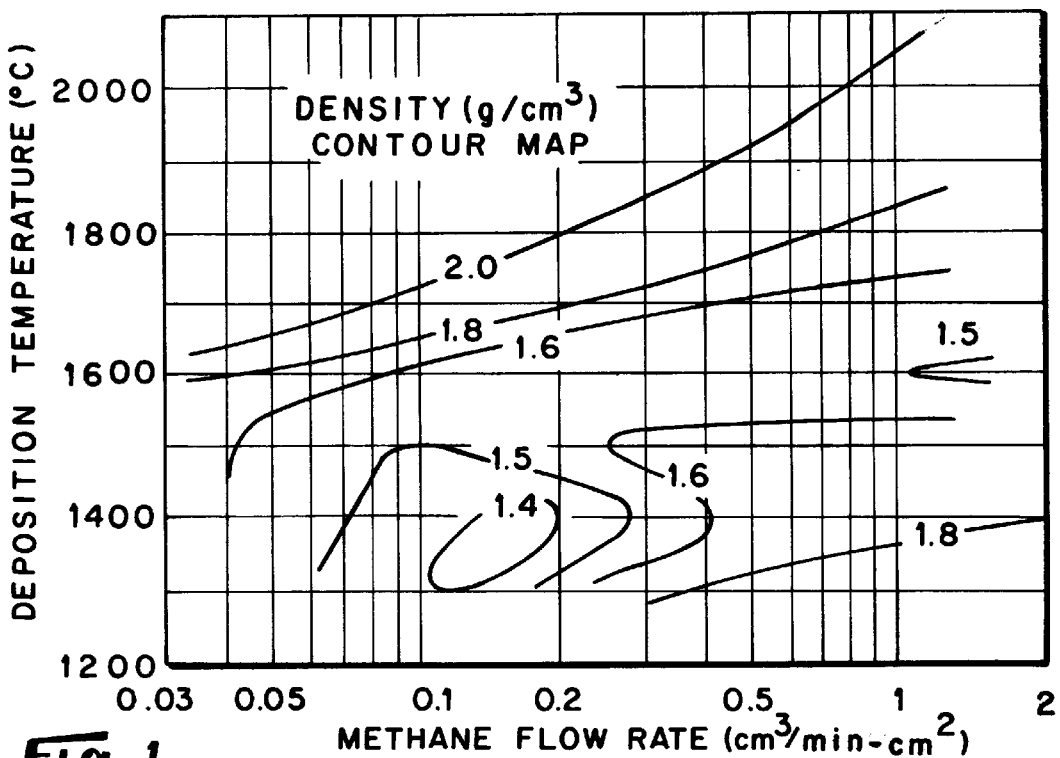

United States Patent

Beatty et al.

[11] Patent Number: 6,081,574
[45] Date of Patent: Jun. 27, 2000

[54] VOID FORMING PYROLYTIC CARBON COATING PROCESS

[75] Inventors: Ronald L. Beatty; Jackie L. Cook, both of Oak Ridge, Tenn.

[73] Assignee: The United States of America as represented by the United States Department of Energy, Washington, D.C.

[21] Appl. No.: 04/430,515

[22] Filed: Feb. 3, 1965

[51] Int. Cl.[7] .................................................. G21C 3/20
[52] U.S. Cl. ................. 376/411; 376/261; 427/6
[58] Field of Search ............... 264/0.5; 117/100; 176/67, 91; 23/14.5 ABC; 376/411, 261; 407/6

[56] References Cited

U.S. PATENT DOCUMENTS 3,151,037  9/1964  Johnson et al. ........................ 176/91

OTHER PUBLICATIONS

Reactor Materials, vol. 6, No. 2, pp. 30,33,36,37, May 1963.

*Primary Examiner*—Harvey E. Behrend
*Attorney, Agent, or Firm*—Emily G. Schneider; William R. Moser; Paul A. Gottlieb

[57] ABSTRACT

A pyrolytic carbon coated nuclear fuel particle and method of making it. The fuel particle has a core composed of a refractory compound of an actinide metal. The pyrolytic carbon coating surrounds the core so as to provide a void volume therebetween. The coating has an initial density of no greater than 1.45 grams/cm$^3$ and an anisotropy factor than 3.0 and a final density upon heat treatment above about 2000° C. of greater than 1.7 grams/cm$^3$ and an anisotropy factor greater than 5.

12 Claims, 1 Drawing Sheet

VOID FORMING PYROLYTIC CARBON COATING PROCESS

This invention relates to processes for preparing coated nuclear fuel particles and more particularly to an improved process for preparing pyrolytic carbon coated nuclear fuels wherein the formed product has certain improved characteristics.

Coated nuclear fuel, particles are widely known in the art. Such nuclear particles have been coated with ceramics, refractory metals and carbon or graphite to name only a few. Of particular interest are nuclear fuel particles coated with pyrolytic carbon. This is generally attributed to their excellent high temperature properties and high resistance to corrosive attack. It is of utmost importance to provide a coating which will maintain its gas-tight integrity during the irradiation period. As is known, the fuel core during irradiation undergoes slight swelling, and tests have shown that a considerable gas pressure is built up during irradiation. Thus, the coating must be capable of withstanding these deleterious side effects and maintain its integrity to insure that minimal amounts of fission products are released into the coolant stream. While coatings of pyrolytic carbon are highly impervious to gas flow therethrough, they have been found, when applied to nuclear fuel particles of typical diameter (~200 microns), to undergo cracking and rupture due to pressure buildup, difference in coefficient of thermal expansion between the core and coating, and other thermal stresses.

Various attempts have been employed to alleviate this undesirable consequence of pyrolytic carbon coated fuel particles. An early attempt was to coat the fuel particles with a highly porous coating of carbon and then deposit a pyrolytic carbon coating on top of the porous carbon intermediate coating. The porous layer was therefore provided as space for fission product retention. While this development was successful in providing for fission product retention and a reduction of stresses due to gas pressure buildup during irradiation, it was not at all successful in overcoming an even more serious problem encountered in such fuel particulate development, that being prevention of fuel migration. At such high operating temperatures the fuels comprised in the core have been found to undergo migration into the coating and in most cases cause the coating to fail. With such a scheme of providing a porous carbon coating between the fuel core and the outer impervious pyrolytic carbon coating, it may readily be seen that the contact between the core and the coatings provides a ready path for fuel migration.

Another attempt to alleviate these obstacles has been to provide a void space between the fuel core and the coating. This is shown in U.S. Pat. No. 3,151,037 issued to James R. Johnson et al. entitled "Encased Fuel." The general approach here has been to provide for fission product retention in the void space and eliminate essentially all contact between the fuel core and the coating so as to effectively diminish if not do away with fuel migration through the coating. Generally, this concept comprises effecting a void formation by employing a low density fuel core which upon melting densifies and contracts in volume, pulling away from the coat to form the void, or by disposing between fuel and coating a carbonizable intermediate material, such as a carbon-containing resin, which when heated to high temperatures carbonizes, thus forming a void. This development appears to be most promising in overcoming the fission product retention and fuel migration problems hereinbefore encountered with coated nuclear fuel particles. While such a particle concept is quite attractive, methods proposed for providing such a pyrolytic carbon coated nuclear particle have not been entirely satisfactory. It is highly desirable, however, to provide the art with a simple and efficient method for preparing pyrolytic carbon coated nuclear fuel particles which have a void formation between the core and the coating without resorting to drastic measures of melting the fuel cores or intermediate decomposable coatings which may produce deleterious side effects such as pressure buildup associated with a decomposition operation or partial conversion of the fuel material as might occur when oxide fuels are surrounded by highly porous carbon-containing resin and heated to an elevated temperature to carbonize the resin.

It is, therefore, a general object of this invention to provide an improved method for preparing pyrolytic carbon coated nuclear fuel particles wherein such fuel particles are formed with a void between the fuel core and the pyrolytic carbon coating.

Another object is to provide a method for preparing pyrolytic carbon coated fuel particles of such character wherein the pyrolytic carbon coating is deposited on a fuel core of theoretical density and the void formation is provided in situ upon heat treatment at an elevated temperature.

Still another object is to provide a simple and efficient method for preparing such pyrolytic carbon coated fuel particles wherein the void formation is effected without a melting of the fuel core.

A further object is to provide a method for preparing such pyrolytic carbon coated fuel particles wherein the above objects are obtained without the use of extraneous carbonizable intermediate coating initially disposed between the core and the outer pyrolytic carbon coating.

A still further object of this invention is to provide a method wherein these objects are achieved for pyrolytic carbon coated fuel particles having multiple coatings.

Figure 2:
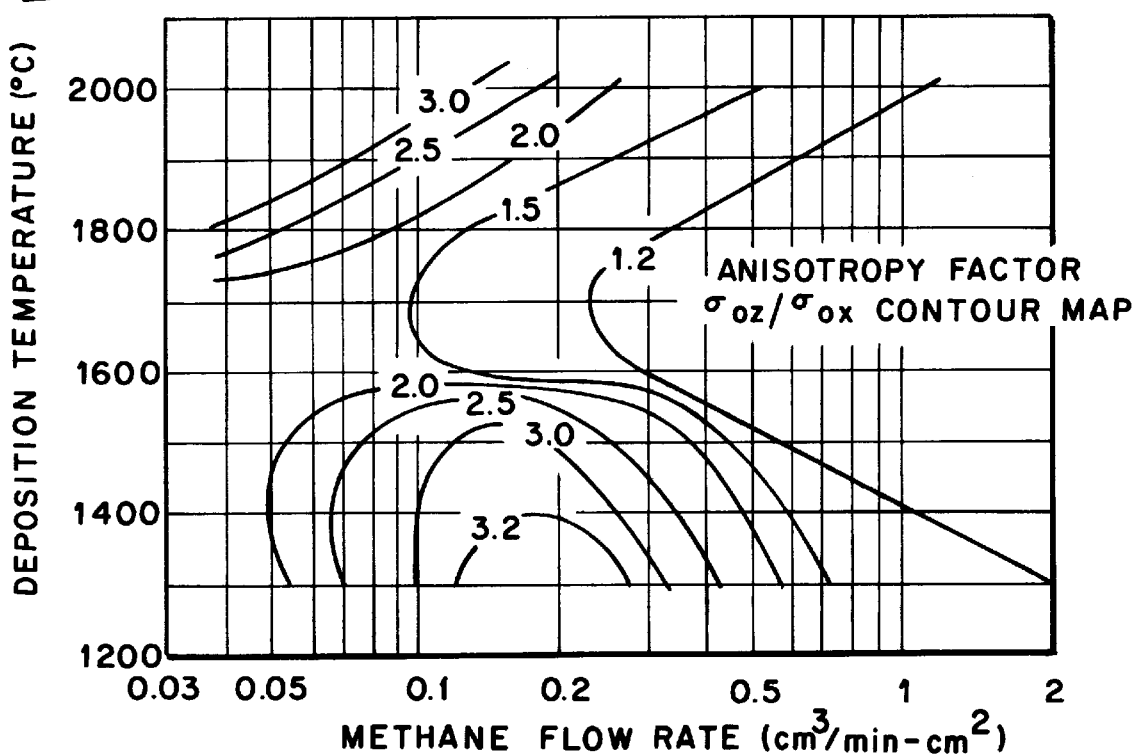

These and other objects of this invention will become apparent from the following detailed description thereof when read in conjunction with the accompanying drawings, of which:

FIG. 1 is a contour map showing the effect of deposition conditions on density properties of pyrolytic carbon coatings; and FIG. 2 is a contour map showing the effect of deposition conditions on anisotropy factors of pyrolytic carbon coatings.

In accordance with the present invention an improved method for preparing pyrolytic carbon coated nuclear fuel particles selected from the group consisting of uranium carbide, thorium oxide, and uranium oxide is provided by depositing a coating of pyrolytic carbon on said nuclear fuel particles at a temperature within the range of 1300°–1500° C., with methane gas at a flow rate between 0.1–0.35 $cm^3$/min.-$cm^2$, and thereafter heat treating the coated fuel particles at a temperature above about 2000° C. for a short period of time without effecting a melting of said fuel particles. Applicants have found that, when a hydrocarbon gas such as methane is thermally decomposed on nuclear fuel particles, such as uranium carbide, thorium carbide and uranium dioxide, at a temperature within the range of 1300°–1500° C. and at a flow rate within the range of 0.1–0.35 $cm^3$/min.-$cm^2$, a maximum void formation between the fuel core and the cladding can subsequently be formed by heat treating such coated particles at a temperature above 2000° C., and preferably about 2400° C., without melting the particles. Referring to FIG. 1, it may be seen that, when methane is decomposed on fuel particles under these critical conditions, the coating not only has a minimum density, it also has a maximum anisotropy factor (FIG. 2). For purposes of this disclosure, anisotropy factor for graphite bodies is defined as the ratio of the thermal expansion coefficients in the directions perpendicular and parallel to the plane of deposition. Thus, it has been found that only when the coating is deposited so as to have the aforementioned critical properties does a maximum void volume occur between the core and the coating by subsequent heat treatment at an elevated temperature. Therefore, it is critical to this invention that the pyrolytic carbon coating be deposited under such conditions so as to have these initial coating properties. It is thought that the coating, upon subsequent heat treatment, becomes densified and the preferred orientation is increased, achieving a final coating density of typically above 1.7 g/cm$^3$ and an anisotropy of about 5; this densification has been found to produce an increase in the inside diameter of the coatings forming a void space between the fuel core and the coating. Inasmuch as the fuel particles were of approximately theoretical density and did not undergo melting, there has been found essentially little or no dimensional change in the fuel particles during the heat treatment. However, the inside diameter of the coating was found to increase by as much as about 15% depending upon the thickness of the coating; this increase affords an inside volume of coating which would accommodate a 50% increase in the volume of the core particle. Also, the outside diameter of the coating was found to undergo essentially little or no increase during the heat treatment.

It will be appreciated by those skilled in the art that, in carrying out a process for coating nuclear fuel particles, deposition parameters have a pronounced effect upon the coating character. Of these parameters temperature of application is probably the dominant variable in that it influences all properties of the coatings such as strength and density. Another major variable is deposition rate which is controlled by temperature and the rate at which the hydrocarbon gas is supplied to the coating chamber relative to the surface area of the charge being coated.

In a first step of this invention nuclear fuel particles, such as 150–250 $\mu$-diameter uranium carbide particles, are suspended in a fluidized bed coating apparatus and fluidized with helium gas. After sufficient time for the uranium carbide particles to come to a deposition temperature within the range of 1300°–1500° C., a hydrocarbon gas, such as methane, was introduced into the inert gas stream at a preselected flow rate to effect an impervious pyrolytic carbon coating of a minimum density on the fuel particles by thermal decomposition of the hydrocarbon gas. The total gas flow (hydrocarbon and inert gas), while not critical, is generally fixed on the basis of fluidizing requirements and, for this, applicants have found a total gas flow rate of 760 cm$^3$/min. quite suitable. Applicants have found that methane flow rates within the range of 0.1 to 0.35 cm$^3$/min.-cm$^2$ are required to provide a coating density of below 1.45 g/cm$^3$ at a deposition temperature of between 1300° and 1500° C. These flow rates provided a methane partial pressure of 50 torr and yielded a pyrolytic carbon coating deposition rate of about 11 $\mu$/hr.

The coating time is not critical, it being apparent that the longer the time the thicker the coating. For this applicants have found that, where 150–250 $\mu$-diameter uranium carbide particles were used, a pyrolytic carbon coating of about 50$\mu$ thick is quite suitable and may be obtained with a coating time of about 4½ hours with a methane flow rate of 0.15 cm$^3$/min.-cm$^2$ at a temperature of 1400° C.

After the fuel particles are coated with pyrolytic carbon, they are next heat treated at an elevated temperature for a period of time sufficient to effect a void formation. Temperatures generally above 2000° C., with a preferred temperature of about 2400° C., have been found to be suitable for this. The heat treatment may be carried out by any convenient method and may be effected either in the fluidized bed or the particles may be transferred to a suitable high temperature furnace. For this applicants have found that the particles may be conveniently heat treated in a high temperature furnace employing a helium atmosphere. In carrying out the heat treatment of the coated particles it is highly desirable, as those skilled in the art appreciate, to provide a maximum free space between the fuel core and the coating for fission product retention. It has been found that the extent of void formation is a function of both the temperature at which the coated particles are heat treated and the length of time of the heat treatment. Thus, it may generally be stated that the higher the heat treatment temperature the shorter the time required to maximize the void formation. It might be well to mention here that the maximum temperature of the heat treatment should never exceed the melting point of the fuel material and preferably it should be substantially below it. For example, where 150–250 $\mu$-diameter uranium carbide particles having a 50$\mu$ pyrolytic carbon coating were heat treated at 2400° C., maximum void formation was attained in as little as two minutes. However, where lower temperatures (~2000° C.) were employed, maximum void formation required a heat treatment of about eight hours.

As a special point, where oxide fuels, such as uranium oxide, are employed, the fuel migration problem is not as serious a problem as where carbide fuels are used. In view of the higher melting point of the oxide it would thus appear that higher heat treatment temperatures may be utilized. However, due to pressure buildup from gaseous reaction products, such as CO, the maximum temperature to which the oxide particles may be heat treated will depend upon the ultimate strength of the coating, which serves as a pressure vessel, to withstand the buildup of pressure within the coating. Thus, it will be apparent that the thicker the coating the higher the heat treatment temperature may be; however, in nowise should the temperature of heat treatment exceed the melting point of the oxide. Heat treatments at about 2400° C. have been found to be quite satisfactory for uranium oxide particles having a 50$\mu$ pyrolytic carbon coating.

The maximum void volume obtained has been found to be about 50% of the volume of the core particles and thus appears to be quite adequate for fission product retention.

The coated particles produced by this process are highly resistive to fuel migration such as occurs when uranium carbide fuel particles are employed. Tests indicate that, where uranium carbide particles (150–250$\mu$-diameter) were coated with pyrolytic carbon (~50$\mu$) having a density greater than 1.45 g/cm$^3$, such as about 1.7 g/cm$^3$, at 1500° C. without any subsequent heat treatment, uranium was found to have migrated through about 50% of the coating thickness when heated at about 2200° C. for one hour, while uranium carbide particles produced in accordance with this process showed no signs of uranium migration. In addition to the excellent retardation of fuel migration, it is believed that the void space produced between the fuel particles and the pyrolytic carbon coating will offer resistance to migration of certain solid fission products, such as barium.

Having thus described the present invention in a general fashion, the following examples are provided to illustrate the quantitative aspects and procedures in greater detail. Example I demonstrates the effect of deposition variables on such properties as density, preferred orientation (anisotropy factor) and apparent crystallite size of pyrolytic carbon coatings as applied to uranium carbide fuel particles.

EXAMPLE I

Apparatus

Fluidizing bed apparatus consisting of a ¾" ID graphite reaction chamber having a 30° included angle cone at the bottom was used for deposition temperatures in the range of 1300° to 1400° C. The reaction chamber was contained in a mullite tube which was housed in a transite shell and insulated with refractory brick and fiberflax. The reaction chamber was heated externally by silicon carbide heating elements and was positioned near the center of the furnace heat zone to insure temperature uniformity of the fluidized bed. Sources of helium and methane were connected to the inlet end of the reaction chamber.

Similarly, a 1" ID graphite reaction chamber having a 30° included angle cone at the bottom was used for deposition temperatures in the range of 1500° to 2000° C. The reaction chamber was heated externally by a graphite resistant element and sources of helium and methane were connected to the inlet end of the reaction chamber.

Deposition temperature was monitored by a thermocouple which was disposed outside the mullite tube and which had previously been calibrated against another thermocouple immersed in the fluidized bed.

Procedure

To determine the effect of deposition variables on pyrolytic carbon coating properties such as density, preferred orientation (anisotropy factor) and apparent crystallite size, separate runs were made as follows: A ten-gram charge of 150–250 $\mu$-diameter melted uranium carbide particles was suspended in the reaction chamber for each run. Three graphite disks ³⁄₁₆" diameter by ³⁄₆₄" thick were also included in each run for use in determining the coating properties of preferred orientation and apparent crystallite size. The bed was fluidized with helium gas and brought up to a deposition temperature which varied from about 1300° C. to 1400° C. for the runs. Methane gas was then introduced into the helium stream at flow rates varying from 0.1 to 0.35 cm³/min.-cm² with the total gas flow rate (helium and methane) being fixed at 760 cm³/min. This phase of the operation was continued until the particles had a coating thickness of about 50$\mu$. For each run the amounts of carbon and the coating thickness were held to approximately 3–5 grams of carbon and 50$\mu$, respectively. Thereafter, the coating operation was terminated and the coated particles examined by X-ray diffraction for apparent crystallite size in the c direction, $L_c$, which was determined from the relation $L_c=0.89\lambda/\beta \cos \theta$, where $\lambda$ is the wavelength of the incident X-rays, $\beta$ is the width at half height in 2 $\theta$ radians of the (00·2) reflection corrected for sample thickness, and $\theta$ is the Bragg angle. The preferred orientation of the carbon coatings was evaluated by the technique described by Bacon ("Journal of Applied Chemistry," Vol. 6, pp. 477–481, 1956). Particle coating densities were determined by crushing the particles, leaching out the fuel, and measuring the densities of the coating fragments directly in a helium pycnometer. Alternatively, the density of the coated particles may be measured with the helium pycnometer and the coated particles oxidized to $U_3O_8$. The coating densities may then be calculated based on coated particle density, weight loss by oxidation, and analysis of the reference core material. The densities of the disk coatings were measured by a sink-float technique in mixtures of methyl alcohol and tetrabromoethane.

Similarly, separate runs were made for deposition temperatures ranging from 1500° C. to 2000° C. and the various properties of the coating determined as above. For these runs the respective charge size for each run was 25 grams of 150–250 $\mu$-diameter melted uranium carbide particles and the total gas flow rate was 2500 cm³/min.

Results

The results for the various runs are shown in Table I below and presented graphically as contour maps in FIGS. 1–2. It may be seen from FIG. 1 that the coating density of the coated uranium carbide particles experiences a minimum from about 1300°–1500° C. with the lowest densities occurring at 1400° C. between 0.1 and 0.35 cm³/min.-cm² methane flow. It may be noted here that the surface area employed was a calculated value based on a mean particle diameter of 188$\mu$ and a measured density of 10.7 g/cm³ for the uncoated carbide. From FIG. 2 it may be seen that, while the pyrolytic carbon coatings had two regions of high anisotropy, only one of the regions coincides with the low-density region at 1300°–1500° C. The other region coincides with the high-density region at low flow rates. It is at these deposition conditions, i.e., temperatures between 1300°–1500° C. and methane flow rates between 0.1 and 0.35 cm³/min.-cm², which provide this coincidence of properties of the coatings, that the improved pyrolytic carbon coated particles are formed when subsequently heat treated at temperatures above 2000° C.

TABLE I

Deposition Conditions and Properties of Pyrolytic Carbon Coatings Applied to Uranium Carbide Particles

| Run No. | Methane Partial Pressure[a] (torr) | Methane Flow Rate (cm³/min.-cm²) × 10⁻² | Average Deposition Rate ($\mu$/hr.) | Coating Density[b] (g/cm³) Disk | Coating Density[b] (g/cm³) Coated Particles | Apparent Crystallite Size[c] (Å) | Anisotropy Factor[c] ($\sigma_{oz}/\sigma_{ox}$) |
|---|---|---|---|---|---|---|---|
| 1300° C. | | | | | | | |
| 237 | 15 | 5.0 | 2.7 | 1.35 | 1.47 | d | 1.8 |
| 222 | 16 | 5.3 | 2.3 | 1.41 | 1.56 | 37 | 1.8 |
| 250 | 25 | 8.3 | 4.0 | 1.35 | 1.41 | d | 3.1 |
| 218 | 40 | 13.3 | 7.0 | 1.42 | 1.51 | 32 | 2.5 |
| 247 | 60 | 20 | 10.0 | 1.60 | 1.63 | d | 3.8 |
| 209 | 80 | 27 | 10.6 | 1.78 | 1.67 | 34 | 3.3 |
| 189 | 100 | 33 | 13 | 1.94 | d | 34 | 2.9 |
| 176 | 160 | 53 | 17 | 1.98 | 1.88 | 37 | 2.0 |

TABLE I-continued

Deposition Conditions and Properties of Pyrolytic Carbon Coatings Applied to Uranium Carbide Particles

| Run No. | Methane Partial Pressure[a] (torr) | Methane Flow Rate (cm³/min.-cm²) × 10⁻² | Average Deposition Rate (μ/hr.) | Coating Density[b] (g/cm³) Disk | Coating Density[b] (g/cm³) Coated Particles | Apparent Crystallite Size[c] (Å) | Anisotropy Factor[c] ($\sigma_{oz}/\sigma_{ox}$) |
|---|---|---|---|---|---|---|---|
| 190 | 230 | 77 | 30 | 1.98 | 1.98 | 37 | 1.4 |
| 164 | 500 | 167 | 60 | d | 2.01 | 37 | 1.2 |
| 214 | 600 | 200 | 67 | d | 2.06 | 37 | 1.2 |
| 217 | 760 | 253 | 82 | 2.06 | 2.07 | 38 | 1.3 |
| 229 | 760 | 253 | 87 | 2.06 | 2.20 | d | 1.4 |
| 1400° C. | | | | | | | |
| 193 | 5 | 1.7 | 1.5 | 1.52 | 1.54 | 67 | 2.1 |
| 129 | 10 | 3.3 | 2.5 | d | 1.64 | d | 2.2 |
| 132 | 21 | 7.0 | 4.8 | d | 1.53 | d | 2.5 |
| 154 | 41 | 13.7 | 9.5 | d | 1.48 | d | d |
| 155 | 47 | 15.7 | 11 | d | 1.43 | d | 3.4 |
| 125 | 50 | 16.7 | 11 | d | 1.36 | d | 3.5 |
| 156 | 53 | 17.7 | 12 | d | 1.50 | d | d |
| 152 | 60 | 20 | 13 | d | 1.51 | 37 | 2.4 |
| 134 | 80 | 27 | 17 | d | 1.54 | d | d |
| 139 | 120 | 40 | 26 | d | 1.57 | d | d |
| 140 | 160 | 53 | 33 | 1.43 | 1.63 | 32 | 1.0 |
| 137 | 200 | 67 | 42 | d | 1.62 | d | d |
| 142 | 250 | 83 | 50 | d | 1.69 | d | d |
| 145 | 325 | 108 | 64 | d | 1.69 | d | d |
| 146 | 400 | 133 | 79 | 1.52 | 1.72 | 32 | 1.0 |
| 144 | 500 | 167 | 94 | d | 1.77 | d | d |
| 147 | 600 | 200 | 115 | d | 1.80 | d | d |
| 157 | 760 | 253 | 164 | d | 1.87 | d | 1.0 |
| 1500° C. | | | | | | | |
| 230 | 6 | 2.7 | 2.2 | 1.62 | 1.69 | 85 | 2.1 |
| 228 | 18 | 7.0 | 5.9 | 1.54 | 1.50 | 65 | 1.4 |
| 227 | 47 | 18.7 | 15 | 1.42 | 1.57 | d | 2.7 |
| 232 | 137 | 64 | 53 | 1.49 | 1.69 | d | 1.2 |
| 226 | 333 | 133 | 102 | d | 1.87 | d | d |
| 1600° C. | | | | | | | |
| 238 | 14 | 6.7 | 6.7 | 1.79 | 1.75 | 85 | 1.1 |
| 273 | 15 | 6.0 | 4.6 | 1.81 | 1.67 | d | 1.7 |
| 239 | 23 | 10.7 | 9.2 | 1.64 | 1.58 | 80 | 1.4 |
| 235 | 31 | 13.7 | 13 | 1.69 | 1.59 | d | 1.9 |
| 236 | 69 | 32 | 32 | 1.54 | 1.48 | d | 1.0 |
| 233 | 137 | 64 | 65 | 1.54 | 1.57 | 60 | 1.1 |
| 234 | 271 | 127 | 120 | 1.45 | 1.46 | 55 | 1.1 |
| 1700° C. | | | | | | | |
| 270 | 15 | 6.0 | 4.3 | 1.83 | 2.04 | 120 | 1.5 |
| 271 | 17 | 7.3 | 5.5 | 1.90 | 2.06 | d | 1.4 |
| 243 | 20 | 9.3 | 8.0 | 1.94 | 2.06 | d | 1.6 |
| 242 | 23 | 10.7 | 9.3 | 1.95 | 1.93 | 115 | 1.4 |
| 241 | 54 | 25 | 25 | 1.57 | 1.73 | 90 | 1.3 |
| 240 | 108 | 51 | 53 | 1.79 | 1.60 | 80 | 1.1 |
| 276 | 304 | 133 | 130 | 1.63 | 1.57 | 80 | 1.0 |
| 1800° C. | | | | | | | |
| 251 | 14 | 6.7 | 5.0 | 2.02 | d | 125 | 3.2 |
| 268 | 15 | 6.7 | 5.0 | 1.96 | 2.08 | 120 | 2.0 |
| 280 | 25 | 11.0 | 8.3 | 2.04 | 2.04 | 130 | 1.4 |
| 267 | 30 | 13.0 | 10 | 2.01 | 2.07 | d | 1.7 |
| 279 | 38 | 16.7 | 12 | 1.96 | 1.96 | d | 1.8 |
| 272 | 41 | 12.7 | 11 | 1.81 | 1.96 | d | 1.3 |
| 259 | 54 | 27 | 24 | 2.03 | 1.92 | 115 | 1.4 |
| 269 | 74 | 32 | 27 | 1.87 | 1.94 | d | 1.5 |
| 278 | 152 | 67 | 55 | 1.86 | 1.89 | d | 1.0 |
| 277 | 304 | 133 | 116 | 1.81 | 1.75 | 105 | 1.0 |
| 1900° C. | | | | | | | |
| 266 | 14 | 6.0 | 4.6 | 2.19 | 2.02 | 140 | 5.6 |
| 285 | 25 | 11.0 | 8.3 | 2.09 | 2.08 | d | 1.8 |
| 284 | 38 | 16.7 | 13 | 2.05 | 2.14 | d | 1.6 |
| 249 | 72 | 33 | 21 | 2.03 | 1.99 | 125 | 1.8 |
| 283 | 76 | 33 | 27 | 1.99 | 2.02 | d | 1.7 |
| 282 | 152 | 67 | 54 | 1.88 | 1.89 | d | 1.4 |
| 281 | 304 | 133 | 114 | 1.83 | 1.79 | 115 | 1.0 |
| 2000° C. | | | | | | | |
| 288 | 38 | 16.7 | 13 | 2.09 | 2.00. | 155 | 2.7 |
| 248 | 72 | 33 | 20 | 2.11 | 1.96 | 140 | 1.5 |
| 287 | 76 | 33 | 26 | 2.09 | 1.97 | d | 1.8 |

TABLE I-continued

Deposition Conditions and Properties of Pyrolytic Carbon Coatings Applied to Uranium Carbide Particles

| Run No. | Methane Partial Pressure[a] (torr) | Methane Flow Rate (cm$^3$/min.-cm$^2$) × 10$^{-2}$ | Average Deposition Rate ($\mu$/hr.) | Coating Density[b] (g/cm$^3$) Disk | Coating Density[b] (g/cm$^3$) Coated Particles | Apparent Crystallite Size[c] (A) | Anisotropy Factor[c] ($\sigma_{oz}/\sigma_{ox}$) |
|---|---|---|---|---|---|---|---|
| 286 | 152 | 67 | 53 | 2.12 | 2.00 | 140 | 1.7 |
| 263 | 304 | 133 | 108 | 1.96 | 1.91 | 115 | 1.2 |

[a]System at atmospheric pressure.
[b]Density of coating stripped from disk determined by sink-float technique; density of coating on particles determined by helium pycnometer or burnoff method.
[c]Determined on coating stripped from disk.
[d]Not determined.

Example II demonstrates the procedure and technique employed in carrying out the deposition and heat treatment steps for pyrolytic carbon coated uranium carbide particles.

EXAMPLE II

The same apparatus employed in Example I was used to coat a 10-gram charge of approximately theoretically dense uranium carbide particles (150–250$\mu$ diameter) with a pyrolytic carbon coating of approximately 50$\mu$. The deposition operation was carried out at a temperature of about 1400° C. with a methane flow rate of about 0.15 cm$^3$/min.-cm$^2$; total gas flow rate (helium and methane) was 760 cm$^3$/min.

After a period of about 4½ hours, the carbon deposit, which was in laminar form, was about 50$\mu$ thick. The coating operation was then terminated and the coated particles transferred to a high temperature graphite resistance furnace. The coated particles were heat treated at 2400° C. in a helium atmosphere for a period of about 2 minutes without effecting a melting of the uranium carbide particles.

The heat treated particles were then removed from the furnace and examined. Microradiographs of the heat treated particles indicated that a void formation had been effected between the fuel particles and the pyrolytic carbon coating. The width of the void, measured along the radius, was found to be between 10–15 microns, providing a void volume of 30–50% of the volume of the fuel particles. The coating density was found to have increased from an initial density of 1.45 g/cm$^3$ to a final density of 1.89 g/cm$^3$ after heat treatment.

Example III demonstrates the excellent resistance to fuel migration the improved particles of this process have and Example IV demonstrates the applicability of this process in preparing duplex coated particles which have these improved characteristics.

EXAMPLE III

Separate 10-gram batches of approximately theoretically dense uranium carbide particles (150–250$\mu$ diameter) were coated in the apparatus employed in Example I as follows: The first batch was coated with pyrolytic carbon by passing methane in a helium stream at a flow rate of 0.15 cm$^3$/min.-cm$^2$ (total gas flow rate 760 cm$^3$/min.) and a temperature of about 1400° C. Under these conditions the initial density of the pyrolytic carbon coating was approximately 1.45 g/cm$^3$. The second batch was coated with pyrolytic carbon by passing methane in a helium stream (total gas flow rate 760 cm$^3$/min.) at a flow rate of 0.5 cm$^3$/min.-cm$^2$ and a temperature of 1500° C. Under these conditions the pyrolytic carbon coatings had an initial density of about 1.7 g/cm$^3$ as deposited. Both batches had a pyrolytic carbon coating of approximately 50$\mu$ thick.

The first batch of coated particles was heat treated in a graphite resistance high temperature furnace employing a helium atmosphere at a temperature of about 2400° C. for a period of 2 minutes without effecting a melting of the uranium carbide particles. No heat treatment was given the second batch of coated particles. Subsequently, samples of both batches were heated simultaneously at 2200° C. for a period of one hour. Thereafter the particles were examined and resulting microradiographs indicated that the heat treated coated particles had no signs of uranium migration, whereas those particles which were not heat treated were found to have experienced uranium migration through approximately 50% of the coating thickness.

EXAMPLE IV

Samples of the first batch of uranium carbide particles coated in Example III were transferred back to the coating apparatus after heat treatment at 2400° C., for 2 minutes and a second deposit of pyrolytic carbon was applied. The deposition temperature was 1800° C. with a methane flow rate of 0.07 cm$^3$/min.-cm$^2$ for this second coating operation. The deposition operation continued until the second coating was approximately 50$\mu$ thick (total coating thickness 100$\mu$). This second coating had a density of 2.0 g/cm$^3$ and was found to be of columnar form. Examination of the duplex coated particles indicated no reaction between the core and the coating as a result of the multiple coating operation.

In this manner, it may be seen that the pyrolytic carbon coated uranium carbide particles having a void formation between the core and the coating may be provided with a second or even a third coat of carbon as desired without any deleterious effects upon the void volume.

Example V illustrates the applicability of this process for fabricating single and/or multilayer pyrolytic carbon coated thoria particles and Example VI demonstrates a method for preparing single and/or multilayer pyrolytic carbon coated uranium oxide particles by this process.

EXAMPLE V

The same apparatus employed in Example I was used to coat a batch (10 grams) of approximately theoretically dense spheroidized ThO$_2$ particles (150–250$\mu$ diameter) with pyrolytic carbon coating of approximately 50$\mu$. The ThO$_2$ particles were prepared by the Sol Gel Process, The deposition operation was carried out at a temperature of about 1400° C. with a methane flow rate of about 0.15 cm³/min.-cm²; total gas flow rate (helium and methane) was 760 cm³/nin. This phase of the operation was continued until the carbon deposit was about 50μ thick and required about 4½ hours.

After the deposition operation was completed, about 0.2 gram sample of the coated particles was taken and heat treated at 2400° C. for 2 minutes without effecting a melting of the ThO₂ particles. The heat treated particles were then removed from the furnace and examined. Microradiographs of the heat treated particles indicated that a void formation had been effected between the fuel particles and the pyrolytic carbon coatings. The width of the void, measured along the radius, was found to be between 10–15 microns, providing a void volume of about 30–50% of the volume of the fuel particles.

A sample of the pyrolytic carbon coated ThO₂ particles was placed in the furnace and a second coating of pyrolytic carbon (50μ thick) was deposited on the particles. For this a deposition temperature of about 1800° C. was employed with a methane flow rate of 0.07 cm³/min.-cm², a total gas flow rate of 760 cm³/min., and a coating time of about 5 hours, giving a total coating thickness of about 100μ. Subsequent examination of the duplex ThO₂ particles indicated no reaction between the core and the coating as a result of the multiple coating operation.

EXAMPLE VI

The same apparatus employed in Example I was used to coat a 10-gram charge of ~90% of theoretically dense spheroidized UO₂ particles (150–250μ diameter) with pyrolytic carbon coating of approximately 50μ. The UO₂ particles were prepared by sintering green UO₂ particles and spheroidizing by attrition. The deposition operation was carried out at a temperature of about 1400° C. with a methane flow rate of about 0.15 cm³/min.-cm²; total gas flow rate (helium and methane) was 760 cm³/min. Coating time required to attain a coating thickness of about 50μ was about 4½ hours.

After the deposition operation was completed, about 0.2 gram sample of the coated particles was taken and heat treated at 2400° C. for 2 minutes without effecting a melting of the UO₂ particles. The heat treated particles were then removed from the furnace and examined. Microradiographs of the heat treated particles indicated that a void formation had been effected between the fuel particles and the pyrolytic carbon coatings. The width of the void, measured along the radius, was found to be between 10–15 microns, providing a void volume of about 30–50% of the volume of the fuel particles.

A sample of the coated UO₂ particles was transferred back into the furnace and a second coating of pyrolytic carbon (50μ thick) was deposited on the particles. For this a deposition temperature of about 1800° C. was employed with a methane flow rate of 0.07 cm³/min.-cm². Coating time was about 5 hours, giving a total coating thickness of about 100μ. Subsequent examination of the duplex UO₂ particles indicated no reaction between the core and the coating as a result of the multiple coating operation.

Thus, it is readily apparent that what is provided is a novel method for preparing pyrolytic carbon coated fuel particles having improved characteristics by virtue of having maximum void formations between the particle and the coating, this being achieved without resort to incorporating extraneous decomposable carbon containing materials nor melting of the fuel core as required by prior art methods. While the present process has been primarily shown as a method for preparing improved fuel particles having a single layer of pyrolytic carbon coating, multilayer-coated fuel particles, as shown in a number of the example, are meant to be within the scope of this invention. It appears from limited data to date that multilayered coatings might provide protection as against fractures caused by fission product recoil and thus may be desirable.

As many apparently widely different embodiments of this invention may be made without departing from the spirit and scope thereof, it is to be understood that the invention is not limited to the specific embodiments thereof except as defined in the appended claims.

What is claimed is:

1. An improved method of preparing pyrolytic carbon coated nuclear fuel particles composed of a refractory compound of an actinide metal, said fuel particles being characterized by having a void between the fuel particles and its coating, comprising the steps of depositing an impervious coating of pyrolytic carbon on said fuel particles at a temperature within the range of 1300°–1500° C. with methane gas at a flow rate between 0.1–0.35 cm³/min.-cm² and thereafter heat treating said coated fuel particles at a temperature above about 2000° C. for a short period of time without effecting a melting of said fuel particles.

2. The method of claim 1 wherein said nuclear fuel particles are uranium carbide particles having a particle diameter between 150–250 microns, said deposition step being carried out by contacting said particles at a temperature of about 1400° C., and said heat treatment being carried out at about 2400° C. for a period of about 2 minutes without effecting a melting of said fuel particles.

3. The method of claim 1 wherein said pyrolytic carbon coating is of a thickness of about 50 microns.

4. The method of claim 1 wherein said nuclear fuel particles are thorium oxide particles having a particle diameter between 150–250 microns, said deposition step being carried out by contacting said particles at a temperature of about 1400° C., and said heat treatment being carried out at about 2400° C. for a period of about 2 minutes without effecting a melting of said fuel particles.

5. The method of claim 4 wherein said pyrolytic carbon coating is of a thickness of about 50 microns.

6. The method of claim 1 wherein said nuclear fuel particles are uranium oxide particles having a particle diameter between 150–250 microns, said deposition step being carried out by contacting said particles at a temperature of about 1400° C., and said heat treatment being carried out at about 2400° C. for a period of about 2 minutes without effecting a melting of said fuel particles.

7. The method of claim 6 wherein said pyrolytic carbon coating is of a thickness of about 50 microns.

8. An improved method for preparing multilayer pyrolytic carbon coated nuclear fuel particles selected from the group consisting of uranium carbide, thorium oxide and uranium oxide which are characterized by having a void between the fuel particle and its coating comprising the steps of depositing an impervious coating of pyrolytic carbon on said fuel particles by contacting said fuel particles at a temperature between 1300°–1500° C. with methane gas at a flow rate within the range of about 0.1–0.35 cm³/min.-cm², said coating having a density no greater than 1.45 g/cm³ and an anisotropy factor above 3.0, heat treating said coated particles at a temperature of about 2400° C. for a period of about 2 minutes and thereafter depositing a second pyrolytic carbon coating on said coated particles by contacting said coated particles at a temperature of about 1800° C. with methane gas at a flow rate of about 0.07 cm³/min.-cm².

9. The method of claim 8 wherein said fuel particles are within the particle size range of from about 150 to 250 microns and said pyrolytic carbon coatings are of a total thickness of about 100 microns.

10. Each and every novel feature and/or combination of novel features of the invention described herein.

11. A nuclear fuel particle comprising a core composed of a refractory compound of an actinide metal, an outer pyrolytic carbon coating surrounding said core so as to provide a void volume therebetween, said coating having an initial density of no greater than 1.45 grams/cm$^3$ and an anisotropy factor greater than 3.0 and a final density upon heat treatment above about 2000° C. of greater than 1.7 grams/cm$^3$ and an anisotropy factor greater than 5.

12. The article of claim 11 wherein a second high density pyrolytic carbon layer is disposed about said outer layer of pyrolytic carbon coating.

* * * * *